Patented Apr. 5, 1932

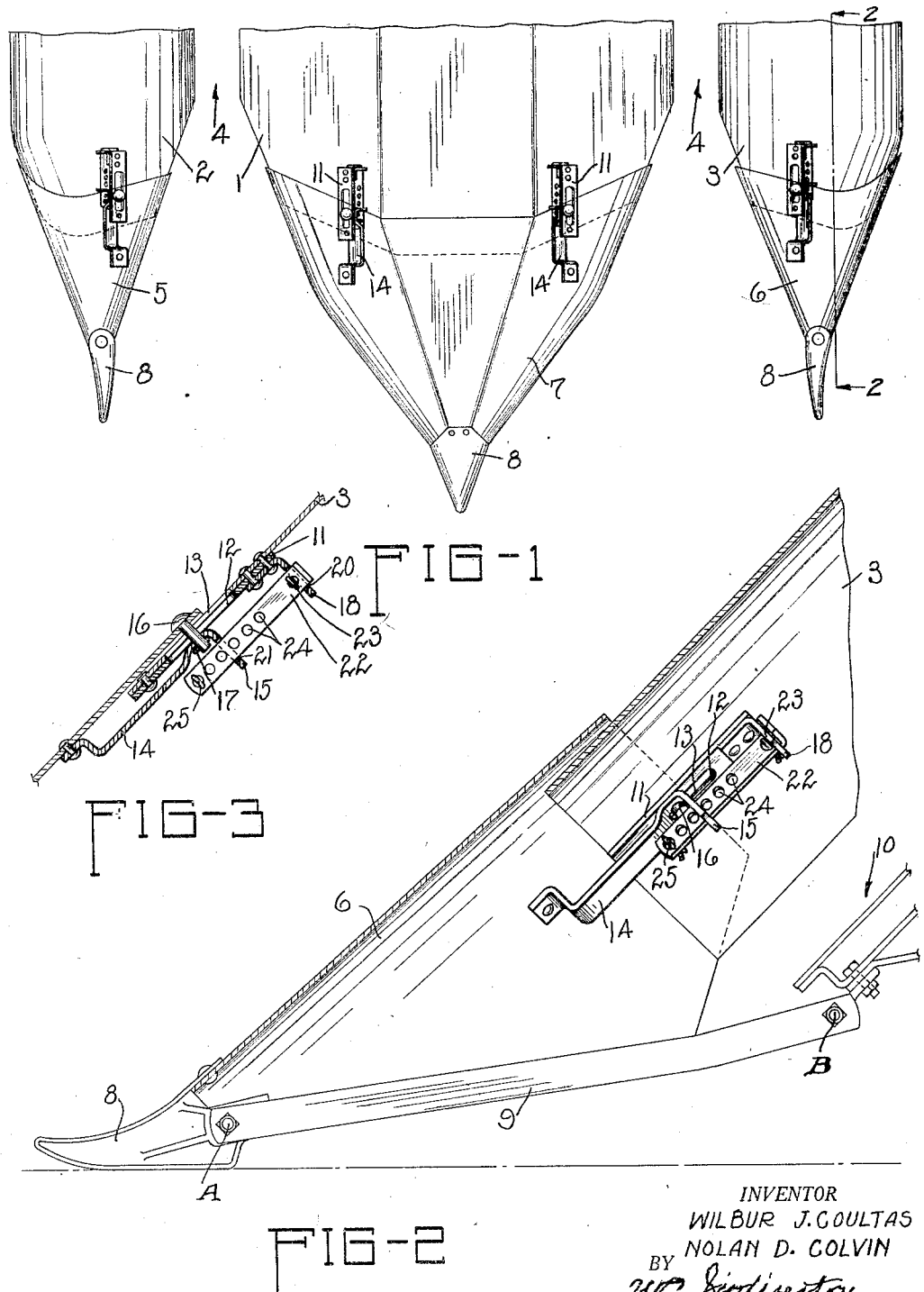

1,852,702

UNITED STATES PATENT OFFICE

WILBUR J. COULTAS AND NOLAN D. COLVIN, OF MOLINE, ILLINOIS, ASSIGNORS TO DEERE & COMPANY, OF MOLINE, ILLINOIS, A CORPORATION OF ILLINOIS

CORN HARVESTER

Application filed October 6, 1930. Serial No. 486,726.

Our invention relates to agricultural machines of the type employed for harvesting corn or similar rowed crops, and has for its object to provide a flexibility of operation in the parts functioning to gather and guide the stalks to the cutting or other mechanism.

Referring to the drawings in which similar numerals indicate identical parts—

Figure 1 is a shadow-graphic representation of the forward parts of the gathering and guiding arms of a corn harvester illustrating, in heavy lines, our invention and its location;

Figure 2 is an enlarged detail section on the line 2—2 of Figure 1 showing our invention in perspective and in operative position; and, Figure 3 is a longitudinal detail section of our invention.

The type of gathering arms shown is well known, each arm being composed of an inclined main body portion rounded in cross section and rigidly secured to the frame work of the harvester. The central arm 1 is double and between it and the side arms 2 and 3 are the passageways 4 through which the standing corn is guided to the cutting or picking mechanism. Shoes 5, 6 and 7 terminate the forward ends of the arms 1, 3, and 2, respectively, and as the arm 1 is double the shoe 7 thereon is also double. Each shoe overlaps its respective arm and to the forward end of each shoe is rigidly secured a runner 8 adapted to contact with the ground surface. The runners 8 are pivotally attached to bars 9 by bolts A, only one of said shoes and bars is indicated as shown in Figure 2, said bars extend rearwardly to adjacent parts 10 of the harvester frame to which they are pivotally connected by suitable bolts B, as shown in Figure 2.

The modern type of corn harvester is adjustable to vary the height of the cut, consequently any attachment pivotally mounted on the gathering arms, extending forwardly therefrom and normally contacting with the surface of the ground, must swing vertically relative to the harvester when the latter is adjusted either up or down. The shoes described, under ordinary conditions of a harvest, float freely over the ground by reason of their pivotal attachment to the gathering arms irrespective of the adjustment of the harvester. Conditions of the crop being cut and the ground surface may make it desirable that the shoes be adjustable to limit their vertical swing and to raise them from contact with the ground or to return them to normal freely operative position. To adjust the shoes vertically we employ our invention, described as follows, and as each shoe and gathering arm is similarly fitted with our device, a description of one will suffice:—

Riveted to the under side of the arm is a plate 11 provided with a slot 12 extending longitudinally thereof and registering with a similar slot 13 in the forward end of the arm. A bar 14 is riveted to the shoe and is bent away from the shoe and then at a right angle in the direction of the plate 11 which it overlies for the greater part of its length, then is bent toward the plate 11 and then in parallelism for a limited distance to present a flat surface in slidable contact with the plate 11, and terminates in a part 15 bent outwardly from the plate 11. A bolt 16 extends through the shoe fabric, the slots 13 and 12 and through the bar 14 from which it projects and is held in place by a cotter or pin 17 inserted in a suitable hole in the bolt.

Riveted to the rear end of the plate 11 is a bracket with an arm 18 extending outwardly in which is a slot 20 registering with a similar slot 21 in the part 15 of the bar 14. Extending through the slots 20 and 21 and parallel with the plate 11 is a bar 22 with its rear end bent to contact with the rear face of the arm 18; a pin or cotter 23 in the bar 22, forwardly of the arm 18, holds the bar 22 in place. The bar 22 is provided with a series of holes 24 and extends forwardly of the part 15. A cotter or pin 25 is insertable in either of the holes 24 according to the adjustment of the shoe desired.

As shown in Figure 2 the parts are in position to permit the shoe to float freely to follow the conformation of the ground surface and to rock on its pivot on the frame irrespective of a tilting movement of the front end of the harvester, the bolt 16 sliding freely in the slots 12 and 13 and the bar 14 consequently moving freely along the bar 22. Presuming that it is desirable that the shoe should be adjusted so that it will be out of contact with the ground the shoe is raised on its pivot until the desired adjustment has been made, then by inserting the pin 25 in the hole 24 next to and forward of the part 15 the shoe will be held in the adjusted position, the pin 25 holding the shoe securely against a downward movement.

To hold the shoe in a downwardly adjusted position it is evident that by placing the pin 25 in one of the holes 24 on the opposite side of the part 15 the upward movement is regulated, but whatever the adjustment made the bolt 16 moves freely in the slots 12 and 13 and the bar 14 slides freely on the plate 11 and the bar 22, so that the shoe will still rock freely to the limit of its adjustment.

What we claim is—

The combination with the gathering arms of a corn harvester, of shoes pivotally supported on the harvester and cooperating with said arms in gathering the corn, means to adjustably attach each shoe to its respective arm, said means comprising a slot in the forward part of the arm and longitudinal therewith, a plate secured to the underside of the arm and having a slot registering with the slot in the arm, a bar secured on the shoe and extending parallel with said plate and in sliding contact therewith, a bolt attached to the shoe projecting through said slots and bar and connected with the latter, a part of said bar bent outwardly and having an opening therein, a bracket secured to the rear end of the plate, a bar secured to said bracket and extending through said opening and having holes therein and a pin insertable in either of said holes to limit the pivotal movement of the shoe.

WILBUR J. COULTAS.
NOLAN D. COLVIN.